United States Patent
Banfield

(10) Patent No.: US 6,647,635 B1
(45) Date of Patent: Nov. 18, 2003

(54) DEVICE FOR MEASURING THE SPUR LENGTH ON THE LEG OF A TURKEY

(75) Inventor: Richard Carson Banfield, 7300 Bagley Rd., Mt. Perry, OH (US) 43760

(73) Assignee: Richard Carson Banfield, Mt. Perry, OH (US)

( * ) Notice: Subject to any disclaimer, the term of this patent is extended or adjusted under 35 U.S.C. 154(b) by 0 days.

(21) Appl. No.: 10/244,935

(22) Filed: Sep. 16, 2002

(51) Int. Cl.[7] .................................................. G01B 5/02
(52) U.S. Cl. ........................................ 33/511; 119/174
(58) Field of Search .................. 33/511, 512; D22/199; 119/174

(56) References Cited

U.S. PATENT DOCUMENTS

| | | | | |
|---|---|---|---|---|
| 1,555,792 A | * | 9/1925 | Souder | 33/810 |
| 3,224,412 A | * | 12/1965 | Fuentes, Jr. | 119/851 |
| 3,334,419 A | * | 8/1967 | Jaye | 33/702 |
| 3,645,002 A | * | 2/1972 | Hefti | 33/628 |
| 5,235,988 A | * | 8/1993 | Johnson et al. | 600/587 |
| 5,611,149 A | * | 3/1997 | Fujiwara | 33/833 |
| 5,637,838 A | * | 6/1997 | Arey et al. | 177/148 |
| 6,128,824 A | * | 10/2000 | Yang | 33/511 |
| 6,263,585 B1 | * | 7/2001 | Dickinson et al. | 33/836 |

\* cited by examiner

*Primary Examiner*—Charles T. Jordan
*Assistant Examiner*—Kimberly S. Smith

(57) ABSTRACT

A device for measuring the length of a spur on the leg of a turkey. A pair of leg cradles are placed on the back side of a turkey leg with the spur being located between two slide rails. A slide indicator is moved towards the spur until a spur bar comes in contact with the spur. The length of the spur is then determined by reading the measurement on the scale where the slide indicator is aligned.

1 Claim, 5 Drawing Sheets

DEVICE FOR MEASURING THE SPUR LENGTH ON THE LEG OF A TURKEY

BACKGROUND OF THE INVENTION

While the primary purpose of wild turkey hunting is to obtain food for the hunter, the big rights granted the hunter do not rest solely on the volume of meat obtained. Many turkey hunters chose to display tail fans and attempt to measure turkey leg spurs. The length of the leg spur is frequently compared to the length of the spurs found on the legs of a they harvested by a fellow hunter. The longer the spurs, the greater the trophy. Many arguments ensue due to the lack of a standardized me sung device or technique. My invention will establish an accurate and consistent measuring device, thus solving this problem.

BRIEF SUMMARY OF THE INVENTION

The Accu Spur is a measuring device designed to accurately and consistently measure the length of spurs commonly found on the legs of the male wild turkey.

BRIEF DESCRIPTION OF THE SEVERAL VIEWS OF THE DRAWING

Description of the test Drawings

DETAILED DESCRIPTION OF THE INVENTION

Figure 1:
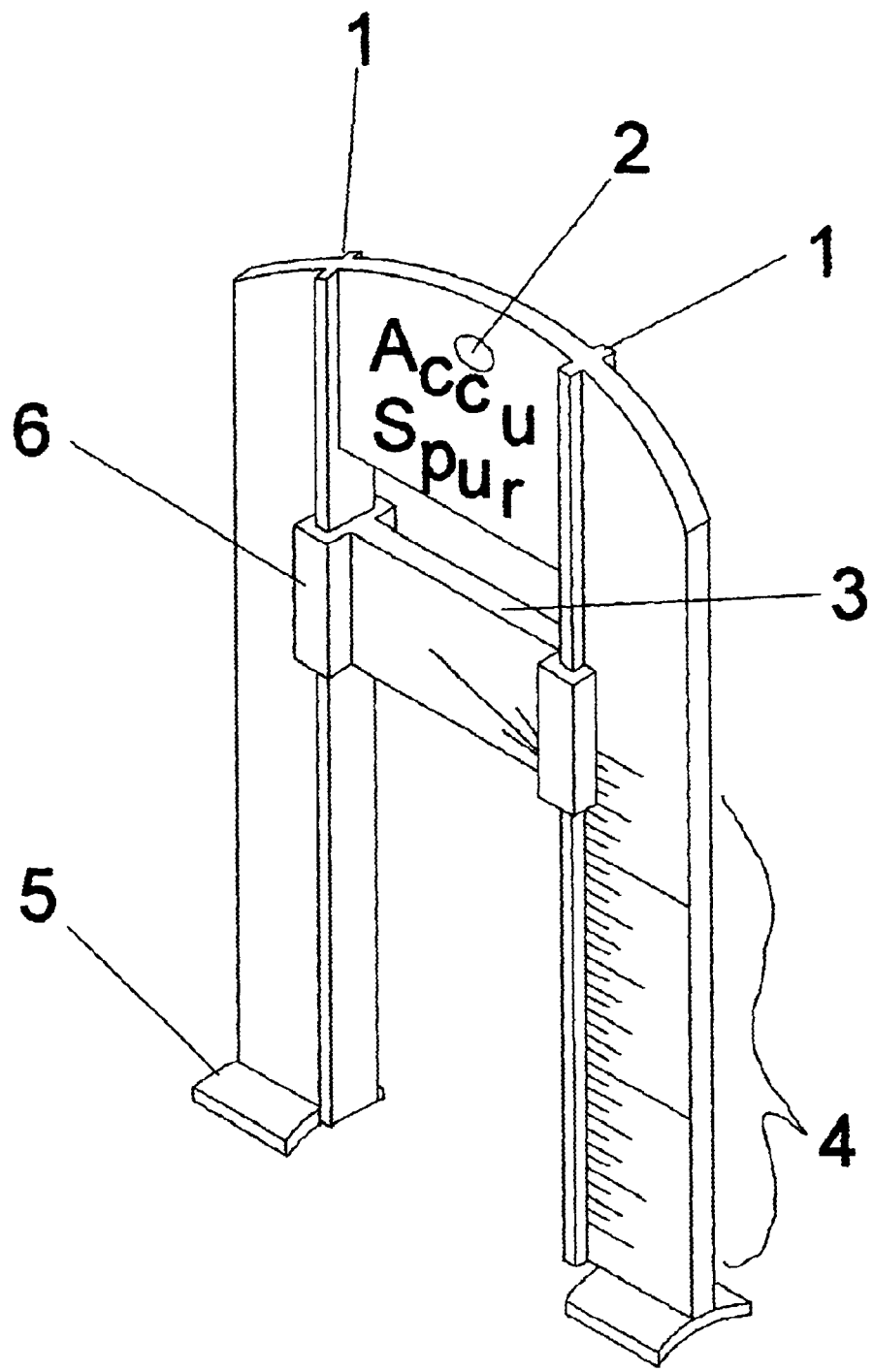
FIG. 1: This drawing sheet depicts the Accu Spur in an isometric drawing drawn full scale with various parts labled by number.
Figure 2:
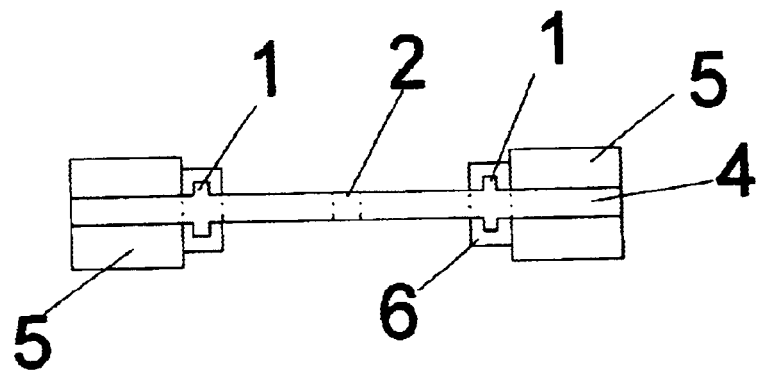
FIG. 2: This drawing depicts the top view of the Accu Spur with various parts Tabled by number. (as in a nultiview drawing)
Figure 3:
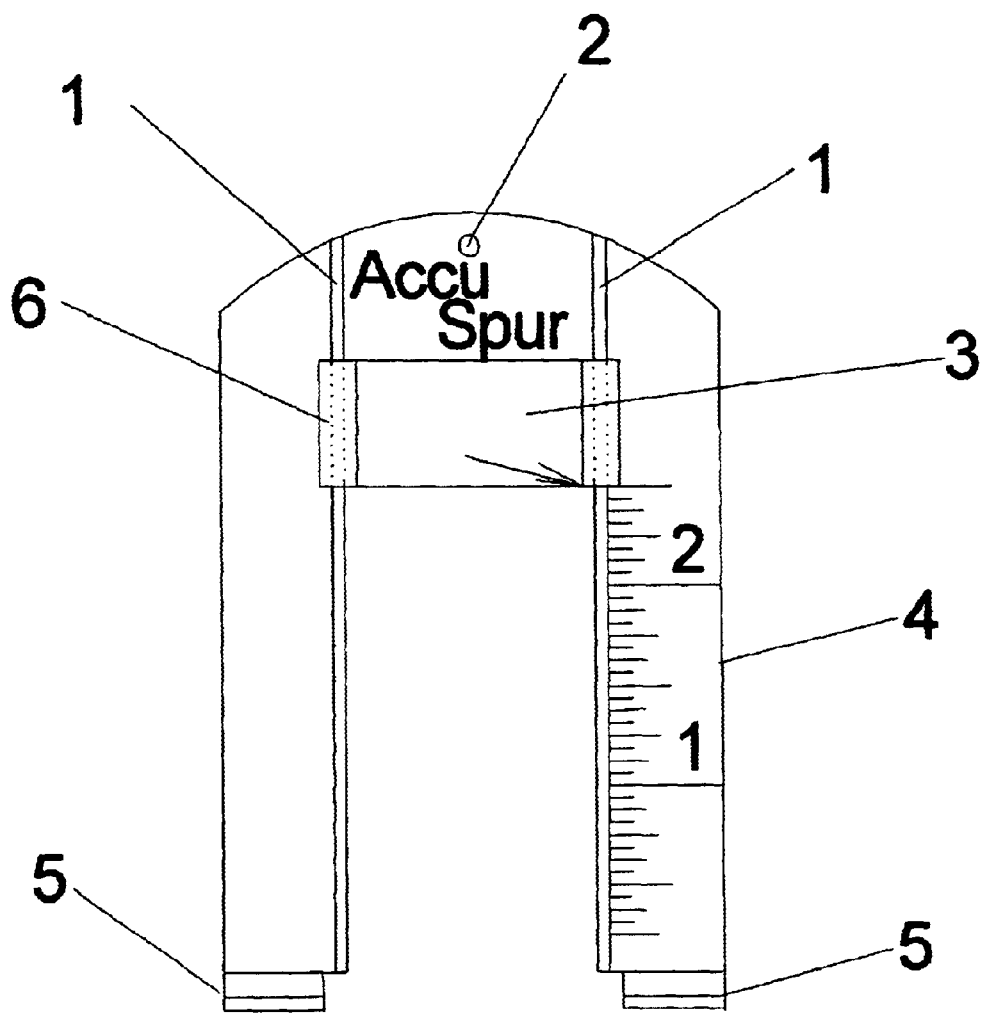
FIG. 3: This drawing depicts the front view of the Accu Spur with various parts labled by number. (as in a multiview drawing)
Figure 4:
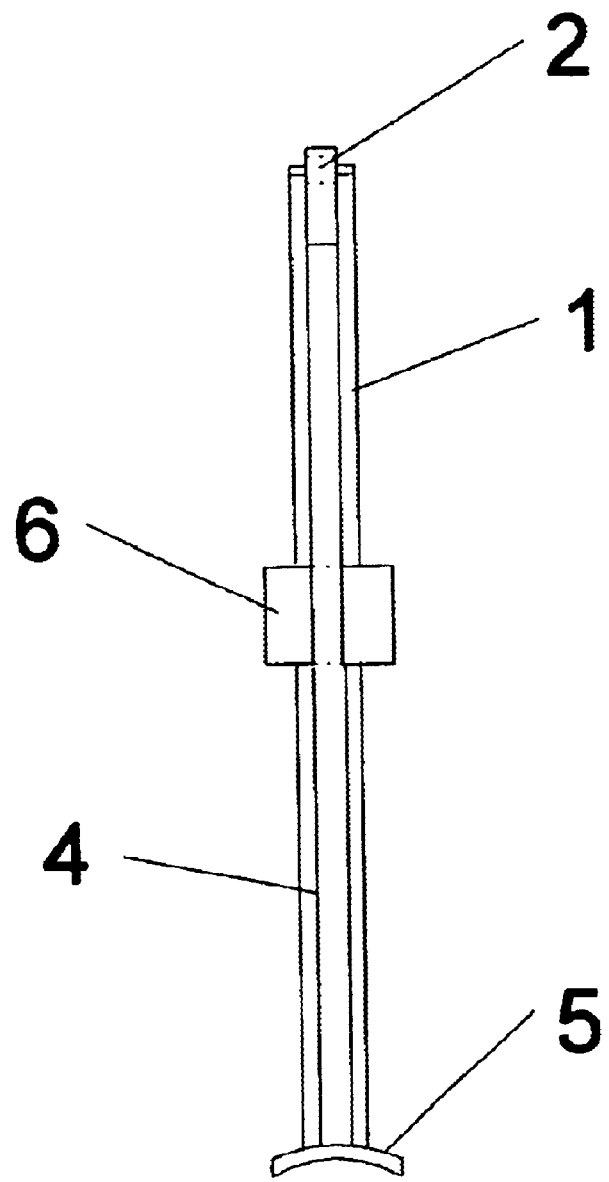
FIG. 4: This drawing depicts He side view of the Accu Spur with various parts labled by number. (as in a multiview drawing)
Figure 5:
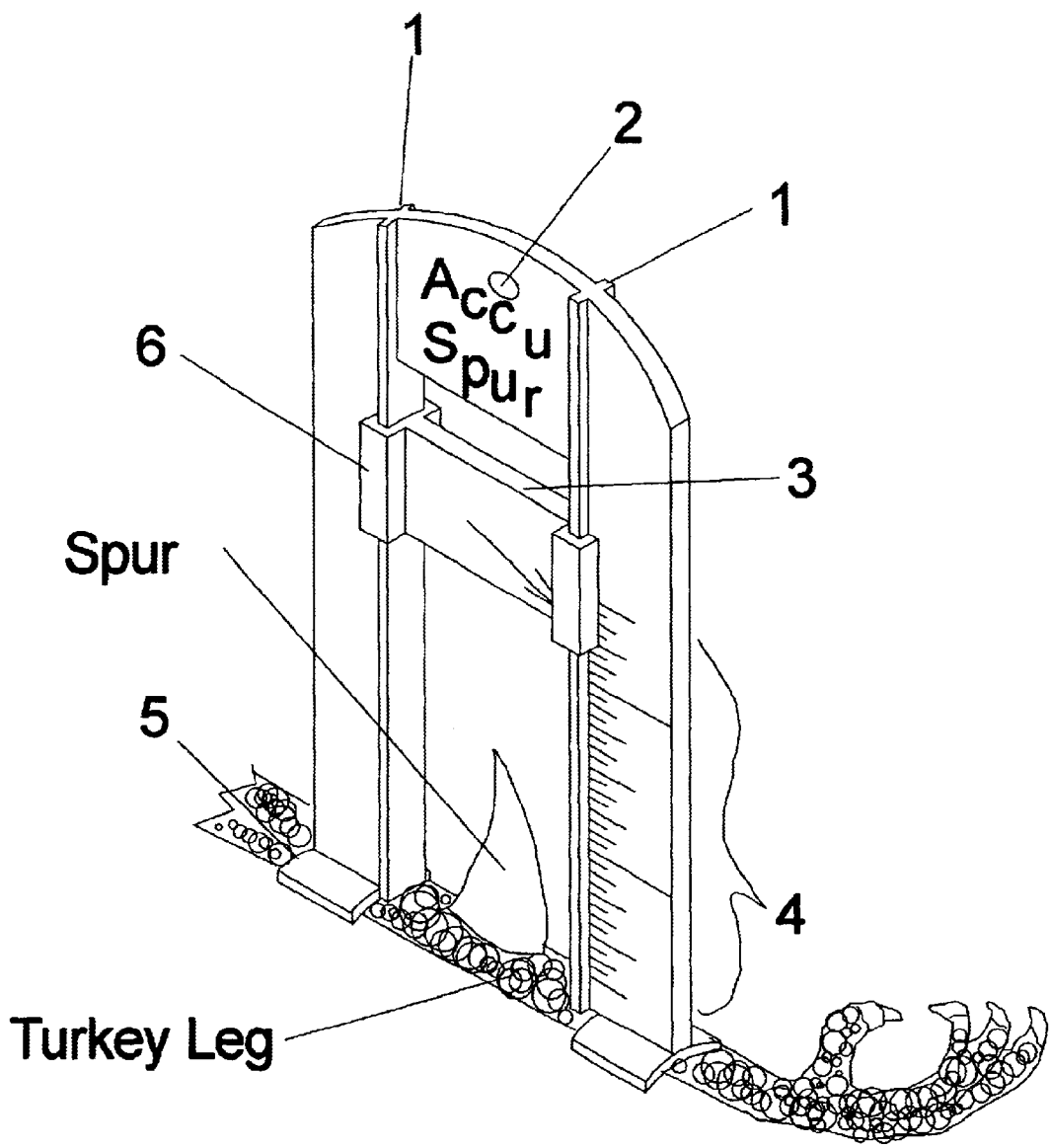
FIG. 5: This is an isometric drawing of the Accu Spur as it would be used to measure a spur on the leg of a turkey.

The Accu Spur is made of two components. Both components of the Accu Spur may be made of any workable material such as a plastic product, wood, or any metal. The process of manufacturing the Accu Spur may be hand made, cast, injection moulded, machined, or any other resonable means of manufacture. If made of a plastic product, or cast material, the dies used will have the mould pattern cut into them using current technology.

When using the Accu Spur, the slide indicator (6)should be placed at the most extreme position (two and one fourth inches), the leg cradles (5) are placed on the back side (spur side) of the turkey leg with the spur located between the two slide railes (1). The curve of the leg cradles (5) will cause them to automatically center on the rounded leg The slide indicator (6) is then moved down until the spur bar (3) is in contact with the spur. The length of the spur is then determined by reading the measurement on the scale (4) where the slide indicator (6) is aligned.

A hole (2) is provided in the Accu Spur for insertion of a lanyard.

What is claimed is:

1. A device for measuring a spur on a leg of a turkey, said device comprising:

a pair of slide rails having a top and a bottom, said slide rails being connected a spaced distance apart at said top, a spur bar extending between two indicators, the indicators engaging said slide rails and being moveable there upon, said bottoms of each of the slide rails being attached to a leg cradle, the leg cradles being curved for aiding in centering said device on the leg of the turkey, and a scale extending from one of said slide rails and being aligned with said indicator for measuring the length of said spur.

* * * * *